(12) United States Patent
Kobayashi et al.

(10) Patent No.: US 8,424,208 B2
(45) Date of Patent: Apr. 23, 2013

(54) MANUFACTURING METHOD FOR BEARING OUTER RING

(75) Inventors: Kazuto Kobayashi, Kanagawa (JP); Hiroshi Koyama, Kanagawa (JP)

(73) Assignee: NSK, Ltd. (JP)

( * ) Notice: Subject to any disclaimer, the term of this patent is extended or adjusted under 35 U.S.C. 154(b) by 698 days.

(21) Appl. No.: 12/522,311

(22) PCT Filed: Jan. 16, 2008

(86) PCT No.: PCT/JP2008/050456
§ 371 (c)(1),
(2), (4) Date: Dec. 2, 2009

(87) PCT Pub. No.: WO2008/087990
PCT Pub. Date: Jul. 24, 2008

(65) Prior Publication Data
US 2010/0101091 A1    Apr. 29, 2010

(30) Foreign Application Priority Data

Jan. 16, 2007 (JP) .................................. 2007-006535
Oct. 1, 2008 (JP) .................................. 2008-002761

(51) Int. Cl.
*B21D 53/10* (2006.01)
*B21J 5/08* (2006.01)
*F16C 33/58* (2006.01)

(52) U.S. Cl.
USPC ..................... 29/898.066; 29/898; 29/898.04; 72/354.2; 72/377; 384/569

(58) Field of Classification Search ............. 29/898.066, 29/898.04; 72/377, 354.2; 384/569
See application file for complete search history.

(56) References Cited

U.S. PATENT DOCUMENTS

| 2008/0089631 A1* | 4/2008 | Kobayashi et al. | ........... 384/569 |
| 2010/0011582 A1* | 1/2010 | Kobayashi et al. | ...... 29/898.066 |
| 2010/0058591 A1* | 3/2010 | Kobayashi et al. | ............. 29/898 |
| 2011/0048097 A1* | 3/2011 | Kobayashi et al. | ............. 72/377 |

FOREIGN PATENT DOCUMENTS

| JP | H9-176740 | 7/1997 |
| JP | H9-280255 | 10/1997 |
| JP | 10-118737 | 5/1998 |

(Continued)

*Primary Examiner* — Alexander P Taousakis
(74) *Attorney, Agent, or Firm* — Hartman Global IP Law; Gary M. Hartman; Domenica N. S. Hartman

(57) ABSTRACT

Provided is a manufacturing method of an outer ring (3) of a back-to-back arrangement double-row angular ball bearing from a raw material (10) comprising a upsetting (A to B), a backward extrusion process (C to D), a punching (D to E), a rolling (E to F) and a finishing, wherein an outer diameter of a first intermediate material (11a) produced by the upsetting is equal to or smaller than an inside diameter of an inner periphery large diameter portion (18) of the inner circumference of a die (13) used in the backward extrusion process and larger than an inside diameter of an inner periphery small portion (19) of the die (13), and in a condition with the first intermediate material (11a) sitting on the inner periphery inclined portion (20) of the die (13), the intermediate material (11a) is pushed toward a base of the die (13) by a punch (14), to thereby the middle metal material (29) with the highest cleanliness of the raw material (10) is exposed to the two outer ring raceways (2) of the outer ring (3).

1 Claim, 8 Drawing Sheets

FOREIGN PATENT DOCUMENTS

| | | |
|---|---|---|
| JP | H11-140543 | 5/1999 |
| JP | 2002-79347 | 3/2002 |
| JP | 2003-230927 | 8/2003 |
| JP | 2006-181638 | 7/2006 |
| JP | 2006177466 | 7/2006 |
| JP | 2006-220221 | 8/2006 |
| JP | 2006-250317 | 9/2006 |
| JP | 2006250317 | 9/2006 |

* cited by examiner

MANUFACTURING METHOD FOR BEARING OUTER RING

TECHNICAL FIELD

The present invention relates to an improved method for manufacturing a bearing outer ring which constitutes a double-row angular rolling bearing incorporated into the rotating support members of a variety of machinery including automobiles, machine tools, and industrial machinery. In the bearing outer ring which is the object of the manufacturing method of the present invention, there is provided a double row of back-to-back arrangement outer ring raceways at two locations in the axial direction on the inner peripheral surface. In such a bearing outer ring, the outer peripheral surface is a cylindrical surface whose outside diameter does not vary substantially in relation to the axial direction, and the inner peripheral surface adopts a shape in which the inside diameter is smallest at the axial center portion, and the portions to either side of the axial center portion are inclined in a direction in which the internal diameter gradually increases with proximity to the axial end portions. A "cylindrical surface whose outside diameter does not vary substantially in relation to the axial direction" means a shape where, with the exception of chamfered portions provided at the edges of the axial end portions, the outside diameter does not change. Furthermore, the bearing outer ring which is the object of the manufacturing method of the present invention, provided this is a double-row angular type, is not limited to the outer ring for ball bearings, but also includes the outer ring for tapered roller bearings.

BACKGROUND ART

In order to construct a rotating support member for a variety of machinery, a back-to-back double-row angular ball bearing 1 such as shown in FIG. 7 is widely used. This double-row angular ball bearing 1 comprises; an outer ring 3 having double-row outer ring raceways 2 on the inner peripheral surface, a pair of inner rings 5 formed with inner ring raceways 4 on the respective outer peripheral surfaces, a plurality of balls 6 provided in a freely rolling manner between the outer ring raceways 2 and the inner ring raceways 4 of both inner rings 5, and a pair of cages 7 for holding the balls 6. In such a double-row angular ball bearing 1, for example, the outer ring 3 is fitted internally into a housing 8, and the inner rings 5 are fitted externally to a rotating shaft 9. The rotating shaft 9 is supported inside the housing 8 in a freely rotating manner.

The outer ring 3 and the two inner rings 5 which constitute such a double-row angular ball bearing 1 are processed to a predetermined shape and size by, for example, performing a forging process, a rolling process, and machining and grinding processes in the well-known manner described in patent documents 1 through 5. For example, the outer ring 3 is conventionally manufactured by the processes shown in FIG. 8. First, this conventional manufacturing method for a bearing outer ring is described.

In the known method of manufacturing a bearing outer ring shown in FIG. 8, first a cylindrical raw material 10 as shown by (A) is obtained by cutting a long piece of a raw material into predetermined lengths.

Next, the raw material 10 is subjected to an upsetting process by compressing the raw material 10 in the axial direction between opposing pressing surfaces of a pair of dies, to obtain a first intermediate material 11 whose outer peripheral surface is a convex circular arc as shown by (B).

Next, this first intermediate material 11 is subjected to a backward extrusion process shown by (C) to (D) to obtain a second intermediate material 12 shown by (D).

The backward extrusion process is performed by compressing the radial center portion of the first intermediate material 11 in the axial direction, between a die 13 and a punch 14, and plastically deforming the radial outlying portion in a direction opposite to the pushing direction of the punch 14. The die 13 is a bottomed cylinder, comprising a circular base plate 15 and a peripheral wall portion 16 which extends upward from the outside edge of the base plate 15. An annular groove 17 is formed around the entire periphery of the outlying portion of the base plate 15. Furthermore, the inner peripheral surface of the peripheral wall portion 16 adopts a stepped shape in which an inner periphery large diameter portion 18 on the opening side (from the center portion to the top end) is connected to an inner periphery small diameter portion 19 on the base plate 15 side (bottom end) by an inner periphery inclined portion 20 on the base plate side of the axial center portion. The inner periphery small diameter portion 19 is positioned upon the same cylindrical surface as the outlying inner peripheral surface of the annular groove 17. Furthermore, the outer peripheral surface of the punch 14 adopts a stepped shape in which an outer periphery small diameter portion 21 at the forward end (lower half) is connected to an outer periphery large diameter portion 22 at the base end (top half) by an outer periphery inclined portion 23 at the axial center portion. The die 13 and the punch 14 having these respective constructions are concentrically secured to and supported by a table and ram of a pressing machine. In other words, the die 13 is secured to the top surface of the table and the punch 14 is secured to the bottom end face of the ram.

When performing this backward extrusion process, with the punch 14 and the ram in an elevated state, the first intermediate material 11 is set inside the die 13. In the case of the conventional manufacturing method, the outside diameter of the first intermediate material 11 is smaller than the inside diameter of the inner periphery small diameter portion 19, at least at the bottom end part at the part which enters inside the inner periphery small diameter portion 19. Accordingly, in a state with the first intermediate material 11 set inside the die 13, the bottom surface of the first intermediate material 11 contacts the inner portion of the annular groove 17 at the top surface of the base plate 15, as shown by (C). Then from this state, the punch 14 is lowered by the ram, thereby compressing the center portion of the first intermediate material 11 in the axial direction between the forward end face of the punch 14 and the top surface of the base plate 15 of the die 13, as shown by (D).

The metal material which is extruded radially outward from the space between the top surface of the base plate 15 and the forward end face of the punch 14 by this compressing action, moves in the opposite direction (upward) to the pressing direction of the punch 14, together with the metal material present at the radially outlying portions of the first intermediate material 11. In this manner, the metal material which moves in the opposite direction to the pressing direction of the punch 14 follows the shape of the outer peripheral surface of the punch 14 and the inner peripheral surface of the peripheral wall portion 16 to form a stepped cylinder whose inner and outer peripheral surfaces are stepped cylindrical surfaces. Furthermore, some of the metal material enters inside the annular groove 17, so that the shape of this portion becomes a rim shape. By the backward extrusion process performed in this manner, a second intermediate material 12 is obtained in the overall shape of a bottomed cylinder in which the inner and outer peripheral surfaces are stepped cylindrical surfaces as shown by (D).

Next, this second intermediate material 12 is subjected to a punching process which punches out a base portion 24 of the second intermediate material 12, to produce a third intermediate material 25 in the shape of a stepped cylinder as shown by (E). This punching process is performed by using a pressing machine to drive a blanking punch through the second intermediate material 12.

After the third intermediate material 25 is produced in this manner, the third intermediate material 25 is subjected to a cold roll forming (CRF) to produce a fourth intermediate material 26 shown by (F). In this cold roll forming, for example the third intermediate material 25 is fitted inside an external diameter side roller which has an inside diameter matching the outside diameter (on the large diameter side) of the third intermediate material 25 and whose inner peripheral surface is a cylindrical surface. Moreover an internal diameter side roller which has an outside diameter sufficiently smaller than the inside diameter of the third intermediate material 25 and whose outer peripheral surface generating line shape corresponds with the generating line shape of the inner peripheral surface of the fourth intermediate material 26 (in opposite relief) is pushed against the inner peripheral surface of the third intermediate material 25. Then, while rotating the internal diameter side roller, it is pushed against the inner peripheral surface of the third intermediate material 25. Because the external diameter side roller is supported in a manner which allows only rotation (in a state where displacement in the radial direction is prevented), then with rotation of the internal diameter side roller, the third intermediate material 25 rotates together with the external diameter side roller. As a result, the generating line shape of the outer peripheral surface of the internal diameter side roller is transferred to the entire periphery of the inner peripheral surface of the third intermediate material 25, and the outer peripheral surface of the third intermediate material 25 is processed into a cylindrical surface.

This rolling process may also be performed by sandwiching part of the third intermediate material 25 between a pair of rollers rotating in mutually opposite directions, and applying pressure to the rollers to push them towards each other so as to transfer the shape of the outer peripheral surfaces of the rollers to the inner and outer peripheral surfaces of the third intermediate material 25. In either case, the fourth intermediate material 26 as shown by (F) is obtained. In this fourth intermediate material 26, the outer peripheral surface forms a cylindrical surface whose outside diameter does not vary substantially in relation to the axial direction, and the inner peripheral surface has an inclined shape where an inside diameter is smallest at the axial center portion and the inside diameter increases gradually towards both axial direction end portions.

The thus obtained fourth intermediate material 26 is subjected to the required finishing processes to thereby complete the outer ring 3 which constitutes the double-row angular ball bearing 1, as shown in FIG. 7. That is to say, by shaving away the excess portion of the fourth intermediate material 26, the outer ring 3 with the shape indicated by the chain lines in FIGS. 8 (F) and FIG. 9 is obtained. Furthermore, the part corresponding to the pair of outer ring raceways 2 formed in the inner peripheral surface of the outer ring 3, is subjected to processes such as a grinding and superfinishing to enhance the surface characteristics of the two outer ring raceways 2.

Incidentally, for the raw material 10 for making the outer ring 3, a column shaped material is used which is made by cutting to predetermined lengths, a long piece of material with a circular cross-section that has been extrusion-molded by a steelmaker. The fact that the composition (cleanliness) of the column shaped raw material 10 obtained in this manner is not uniform, that is the range of the central 40% of the raw material 10 (the central cylindrical section from the core to 40% of the radius) tends to contain non-metallic inclusions, is already well known from descriptions in patent document 6 and other sources. Also known is that in relation to the range of the diametrically outermost 20% of the raw material 10 (the cylindrical section existing on the outer peripheral side more than 80% of the radius from the center), the cleanliness is low due to the susceptibility to the presence of oxides and non-metallic inclusions. Moreover, when metal material with low cleanliness, whether from the center or near the outer peripheral surface, is exposed at the outer ring raceways 2 provided on the inner peripheral surface of the outer ring 3, particularly the part that makes rolling contact with the rolling surface of the ball 6 (FIG. 7), ensuring the rolling fatigue life of these parts is difficult.

When these circumstances are considered, and also variations in the distribution of oxides and non-metallic inclusions within the material as well as various differences that occur at the time of the manufacturing operation (such as compressive force) are considered, the metal material present in the range of the central 50% of the raw material 10 and in the range of the outermost 30% of the raw material 10 is preferably not exposed in the outer ring raceways 2, at least in those parts which make rolling contact with the rolling surface. In other words, at least in the parts of the outer ring raceways 3 which make rolling contact with the rolling surface, preferably the metal material present in a middle cylindrical portion 27 of the raw material 10 (the crosshatched parts of (A) in FIG. 8. The other crosshatched parts in FIGS. 1 to FIG. 6, FIGS. 8 (B) to (F), and FIG. 9 show that these are also composed of the metal material (middle metal material 29) present in the middle cylindrical portion 27), in a range from 50 to 70% of the radius from the center, is exposed.

Incidentally, when a forging process is used to manufacture an outer ring 3 of the type which is the object of the present invention, having a small inside diameter at the axial center portion and comprising double row outer ring raceways at two locations in the axial direction on the inner peripheral surface on either side of this small diameter portion, exposing the metal material present in the middle cylindrical portion 27 to the two raceway surfaces is difficult. For example, when the outer ring 3 shown by the chain line in FIG. 9 is produced by a method such as shown in FIG. 8 above, metal material of each part in the raw material 10, that is the core metal material 28 which is present in the central columnar portion from the center to 50% of the radius, the middle metal material 29 which is present in the middle cylindrical portion 27, that is a range of 50 to 70% of the radius from the center, and the outer metal material 30 which is present in the outlying cylindrical portion, that is a range of the outermost 30%, is distributed throughout the outer ring 3 as shown in FIG. 9. For this outer ring 3, as described above, the fourth intermediate material 26 as shown by the solid line in FIG. 9 is produced by a forging process, after which the fourth intermediate material 26 is shaved off to the state shown by the chain line in FIG. 9, by machining and grinding processes, and completed as the outer ring 3.

In FIG. 9 which shows the fourth intermediate material 26 and the outer ring 3, if the middle metal material 29 present in the middle cylindrical portion 27 shown by the crosshatching is exposed at least at the part of the pair of outer ring raceways 2 which makes rolling contact with the rolling surface of the ball, the rolling fatigue life of these two outer ring raceways 2 is ensured, which easily ensures the durability of the double-row angular ball bearing 1 which includes this outer ring 3. However, as is clear from FIG. 9, when the outer ring 3 is made by the conventional manufacturing method, the core metal material 28 of the central columnar portion is exposed on the entire surface of one outer ring raceway 2 of the two outer ring raceways 2 (the lower outer ring raceway 2 in FIG. 9). For example, the arrows a in FIG. 9 indicate the direction of action of the load applied from the balls 6 to the two outer ring raceways 2 (see FIG. 7) in the case where the contact angle of the balls 6 is 40° (the complementary angle of the contact angle relative to the center axis is 50°. If the middle metal material 29 is present at the part indicated by the arrows α on the chain line in FIG. 9 which indicates the cross-sectional shape of the outer ring 3, then the rolling fatigue life of the two outer ring raceways 2 can be ensured easily. However in relation to the lower inner ring raceway 2 of FIG. 9, the core metal material 28 is present in the part on the chain line indicated by the arrows α. Consequently, in conventionally known methods of manufacturing bearing outer rings, the degree of freedom in the design for ensuring the durability of the double-row angular ball bearing 1 is limited.

Patent document 1: Japanese Patent Application Publication No. Hei 9-176740

Patent document 2: Japanese Patent Application Publication No. Hei 9-280255

Patent document 3: Japanese Patent Application Publication No. Hei 11-140543

Patent document 4: Japanese Patent Application Publication No. 2002-79347

Patent document 5: Japanese Patent Application Publication No. 2003-230927

Patent document 6: Japanese Patent Application Publication No. 2006-250317

DISCLOSURE OF THE INVENTION

Problem to be Solved by the Invention

The present invention takes into consideration the above circumstances, and in the case of manufacturing, by plastically deforming a cylindrical material, a bearing outer ring in which the diameter of the axial center portion of the inner peripheral surface is smaller than the diameter of both end portions and which comprise double-row outer ring raceways at two locations in the axial direction that sandwich the portion with the small diameter, the invention realizes manufacture of a bearing outer ring in which the metal material of the middle cylindrical portion with the highest cleanliness of the raw material is exposed at least at the portions of the two outer ring raceways on which the load of the rolling elements acts.

Means for Solving the Problem

In a first aspect of the manufacturing method for a bearing outer ring of the present invention, in the same manner as in the aforementioned conventionally known manufacturing method for a bearing outer ring illustrated in FIG. 8, a cylindrical material is sequentially subjected to a upsetting process, a backward extrusion process, a punching process, a rolling process, and a finishing process, to thereby produce a bearing outer ring comprising back-to-back arrangement double-row outer ring raceways at two locations in the axial direction on the inner peripheral surface.

In the upsetting process, the material is compressed in an axial direction between mutually opposing pressing surfaces of a pair of dies, to obtain a first intermediate material.

In the backward extrusion process, a center portion of the first intermediate material is compressed in an axial direction between a die and a punch. The die is a bottomed cylinder shape whose inner peripheral surface adopts a stepped shape in which an inner periphery large diameter portion on an opening side and an inner periphery small diameter portion on a base side are connected by an inner periphery inclined portion at an axial center portion. Furthermore, the punch has an outer peripheral surface which adopts a stepped shape in which an outer periphery small diameter portion on a forward end side and an outer periphery large diameter portion on a base end side are connected by an outer periphery inclined portion at an axial center portion. In the backward extrusion process, the center of the first intermediate material is compressed in the axial direction between the forward end face of the punch and the base plate of the die. Then the metal material which is extruded radially outward accompanying this compressing, moves in an opposite direction to a pressing direction of the punch together with metal material present at radially outlying portions of the first intermediate material, thereby obtaining a second intermediate material in the overall form of a bottomed cylinder whose inner and outer peripheral surfaces are stepped cylindrical surfaces.

In the punching process, a base of the second intermediate material is punched out to thereby produce a third intermediate material in the overall form of a cylinder whose inner and outer peripheral surfaces are stepped cylindrical surfaces.

In the rolling process, the inner and outer peripheral surfaces of the third intermediate material are subjected to plastic deformation to produce a fourth intermediate material in which the outer peripheral surface is a cylindrical surface whose outside diameter does not vary substantially in relation to the axial direction, and the inner peripheral surface has a shape in which an inside diameter at the axial center portion is smallest, and in which both side portions of the axial center portion are inclined in a direction in which the inside diameter increases gradually towards both axial ends. The meaning of the outside diameter not varying substantially in relation to the axial direction is as described above.

In the finishing process, the inner peripheral surface of the fourth intermediate material is shaved off to form the two outer ring raceways in the inner peripheral surface.

In particular, in the manufacturing method for a bearing outer ring of the present invention, the outer diameter of the first intermediate material produced by the upsetting process is equal to or smaller than the inside diameter of the inner periphery large diameter portion of the die and larger than the inside diameter of the inner periphery small diameter portion. That is to say, the amount of processing of the material (compressing amount) in the upsetting process, is larger than for the case of the conventional manufacturing method described above, and the outside diameter of the first intermediate material is greater than the outside diameter of the first intermediate material made when the conventional method is executed.

Furthermore, in the backward extrusion process, in a condition with the whole circumference of the first intermediate material sitting on the inner periphery inclined portion of the die, the first intermediate material is pushed towards a base of the die by a forward end face of the punch. Then, after plastically deforming the first intermediate material to a shape where the radially outlying portions are inclined towards the opening of the die, the center of the first intermediate material is compressed in the axial direction, and the radially outlying portion of the first intermediate material is moved in an opposite direction to the pressing direction of the punch, thereby giving the second intermediate material.

Preferably, the pressing surface of one die of the pair of dies used in the upsetting process, is a flat surface, and at least a radially outlying portion of a pressing surface of an other die is an inclined surface which is inclined in a direction away from the pressing surface of the one die with increasing proximity to an outer peripheral edge. Thus, the first intermediate material produced by the upsetting process adopts a shape in which one axial direction surface has a radial center portion which is recessed further than the outer peripheral edge, and the other axial direction surface is flat. Moreover, in the backward extrusion process, the recessed surface is positioned facing the base of the die.

On the other hand, in a second aspect of the manufacturing method for a bearing outer ring of the present invention, a cylindrical material is sequentially subjected to a upsetting process, a simultaneous forward-backward extrusion process, a punching process, a rolling process, and a finishing process, to thereby produce a bearing outer ring comprising back-to-back arrangement double-row outer ring raceways at two locations in the axial direction on the inner peripheral surface. That is to say, instead of the backward extrusion process in the first aspect, a simultaneous forward-backward extrusion process is adopted. The configuration of the manufacturing method for a bearing outer ring according to the second aspect, is the same as the manufacturing method according to the first aspect, apart from the point that the simultaneous forward-backward extrusion process is adopted.

In the simultaneous forward-backward extrusion process, a center portion of the first intermediate material is compressed in the axial direction between a die in the shape of a bottomed cylinder in which a circular protrusion having a height less than half the depth is provided at the center of the base, to give a cylindrical shape forming space between the outer peripheral surface of the circular protrusion and the inner peripheral surface of the die, and a punch having an outside diameter smaller than the inside diameter of the die. Then the metal material extruded outward in the radial direction accompanying this compressing action, together with the metal material present in the radially outlying portion of the first intermediate material, moves into the cylindrical shape forming space and also moves (simultaneously) in the direction opposite to the pressing direction of the punch and into a cylindrical space present between the outer peripheral surface of the punch and the inner peripheral surface of the die, to give a second intermediate material provided with a cross wall on the inside diameter side of an axial center portion of the cylinder. Then this second intermediate material is finished in the same manner as for the case of the manufacturing method according to the first embodiment, to produce a bearing outer ring.

Effects of the Invention

According to the manufacturing method for a bearing outer ring of the present invention configured in the above manner, the metal material of the middle cylindrical portion which has the highest cleanliness for the material, is exposed to at least the portion on which rolling element load acts, of the two outer ring raceways formed at two locations separated in the axial direction sandwiching the part of the inner peripheral surface where the inside diameter is smallest. Consequently, the rolling fatigue life of the two outer ring raceways can be ensured, and the degree of freedom in the design for ensuring the durability of a double-row rolling bearing which includes a bearing outer ring comprising such two outer ring raceways can be improved.

Furthermore, as required, by making the surface in the first intermediate material which faces the base of the die a recessed surface, the metal material of the middle cylindrical portion can be effectively exposed over a greater area of the surface portion of the two outer ring raceways.

In addition, by adopting the simultaneous forward-backward extrusion process instead of the backward extrusion process, the metal material of the middle cylindrical portion which has the highest cleanliness of the raw material can be more sufficiently disposed at the two outer ring raceways, so that the degree of freedom in the design for ensuring the durability of the double-row rolling bearing can be further improved.

DESCRIPTION OF THE REFERENCE SYMBOLS

Figure 1:
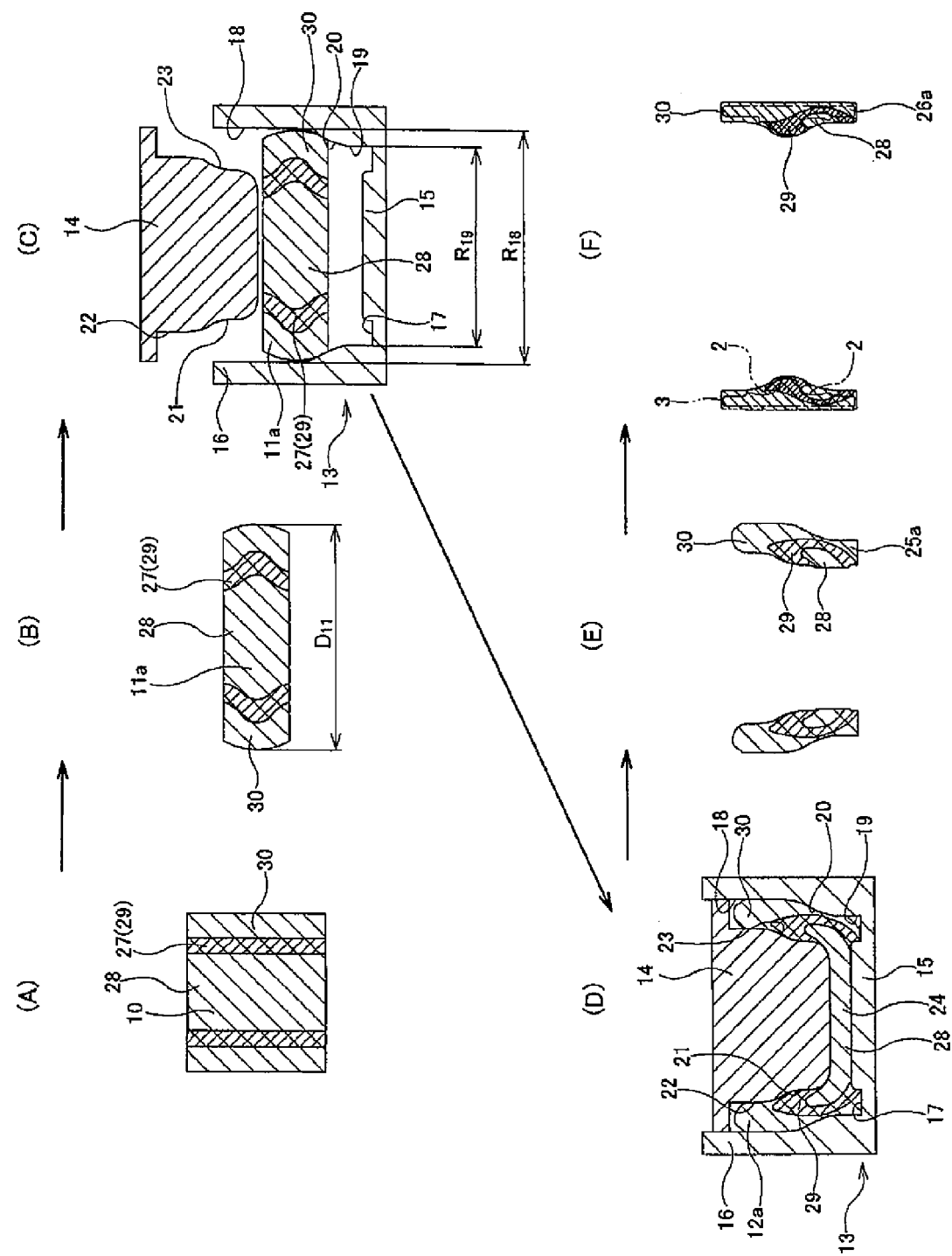
FIG. 1 shows a first example of an embodiment of a manufacturing method for a bearing ring member of the present invention, together with the situations where the distribution state of the metal material of the core columnar portion, the metal material of the middle cylindrical portion, and the metal material of the outermost cylindrical portion changes in the processing sequence, showing cross-sectional views of from the raw material to the fourth intermediate material, and the die and punch.

1 Double-row angular ball bearing
2 Outer ring raceway
3 Outer ring
4 Inner ring raceway
5 Inner ring
6 Ball
7 Cage
8 Housing
9 Rotating shaft
10 Raw material
11, 11a, 11b First intermediate material
12, 12a, 12b, 12c Second intermediate material
13 Die 14 Punch
15 Base plate
16 Peripheral wall portion
17 Annular groove
18 Inner periphery large diameter portion
19 Inner periphery small diameter portion
20 Inner periphery inclined portion
21 Outer periphery small diameter portion
22 Outer periphery large diameter portion
23 Outer periphery inclined portion
24 Base portion
25, 25a, 25b Third intermediate material
26, 26a, 26b Fourth intermediate material
27 Middle cylindrical portion
28 Core metal material
29 Middle metal material
30 Outer metal material
31 Cylinder
32 Cross wall

BEST MODE FOR CARRYING OUT THE INVENTION

First Example of the Embodiment

Figure 2:
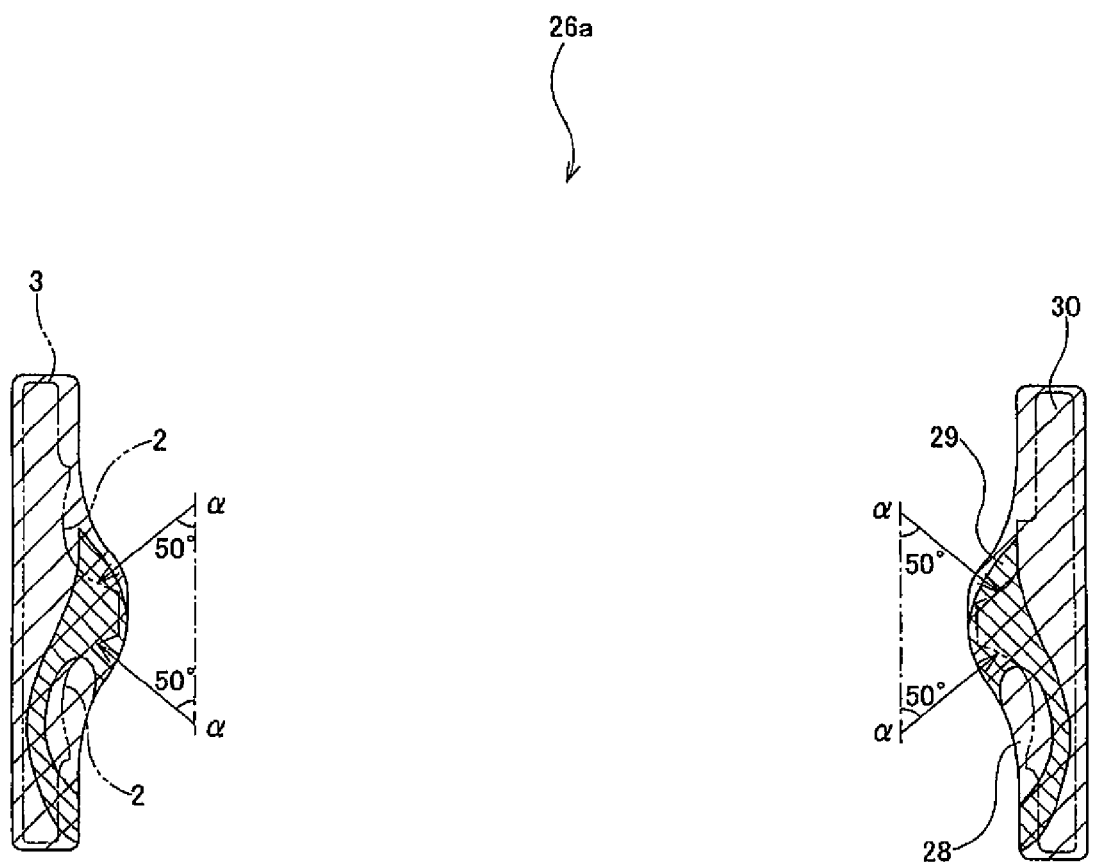
FIG. 2 is a cross-sectional view illustrating the distribution state of the metal material of the core columnar portion, the metal material of the middle cylindrical portion, and the metal material of the outermost cylindrical portion in the stage of the fourth intermediate material of the first example.
Figure 7:
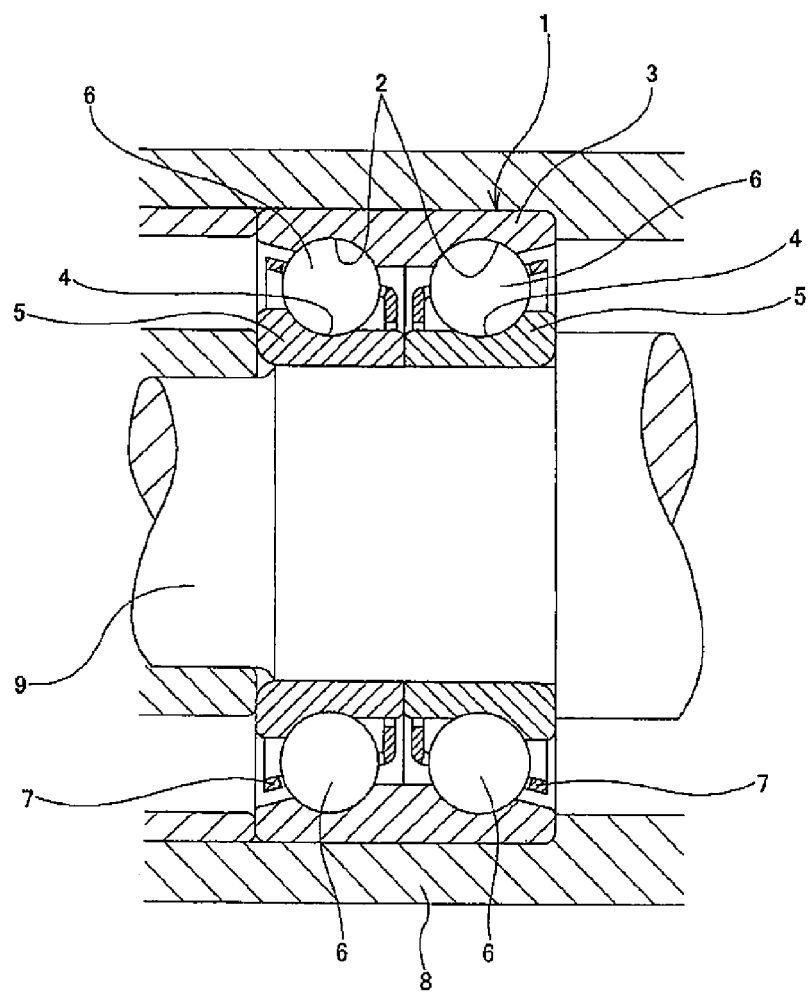
FIG. 7 is a cross-sectional view showing one example of a rotation support member provided with a double-row angular ball bearing comprising a bearing outer ring which is the object of the manufacturing method of the present invention.

FIGS. 1 and FIG. 2 show a first example of an embodiment of the present invention. In the manufacturing method of this example, a cylindrical raw material 10 made of a metal which can be quench hardened after deformation processing, such as a ferrous alloy like a medium carbon steel, a bearing steel, or a cemented steel is sequentially subjected to deformation processing or punching. Then, by way of a first intermediate material 11a shown by (B), a second intermediate material 12a shown by (D), and a third intermediate material 25a shown by (E), a fourth intermediate material 26a shown by (F) is obtained. Furthermore, the fourth intermediate material 26a is subjected to the required machining and grinding processes to obtain an outer ring 3 which constitutes part of the aforementioned double-row angular ball bearing 1 as shown in FIG. 7. The steps for processing the raw material 10 into the fourth intermediate material 26a are described in order below. Of the following processes, the upsetting process, the backward extrusion process, and the punching process illustrated by from (A) to (E) are basically all performed hot or warm, and the rolling process illustrated by from (E) to (F) is performed cold. However in some circumstances such as when forming a small-scale outer ring 3 using for the metal material, one having superior ductility, all processes may be performed cold where possible.

Figure 8:
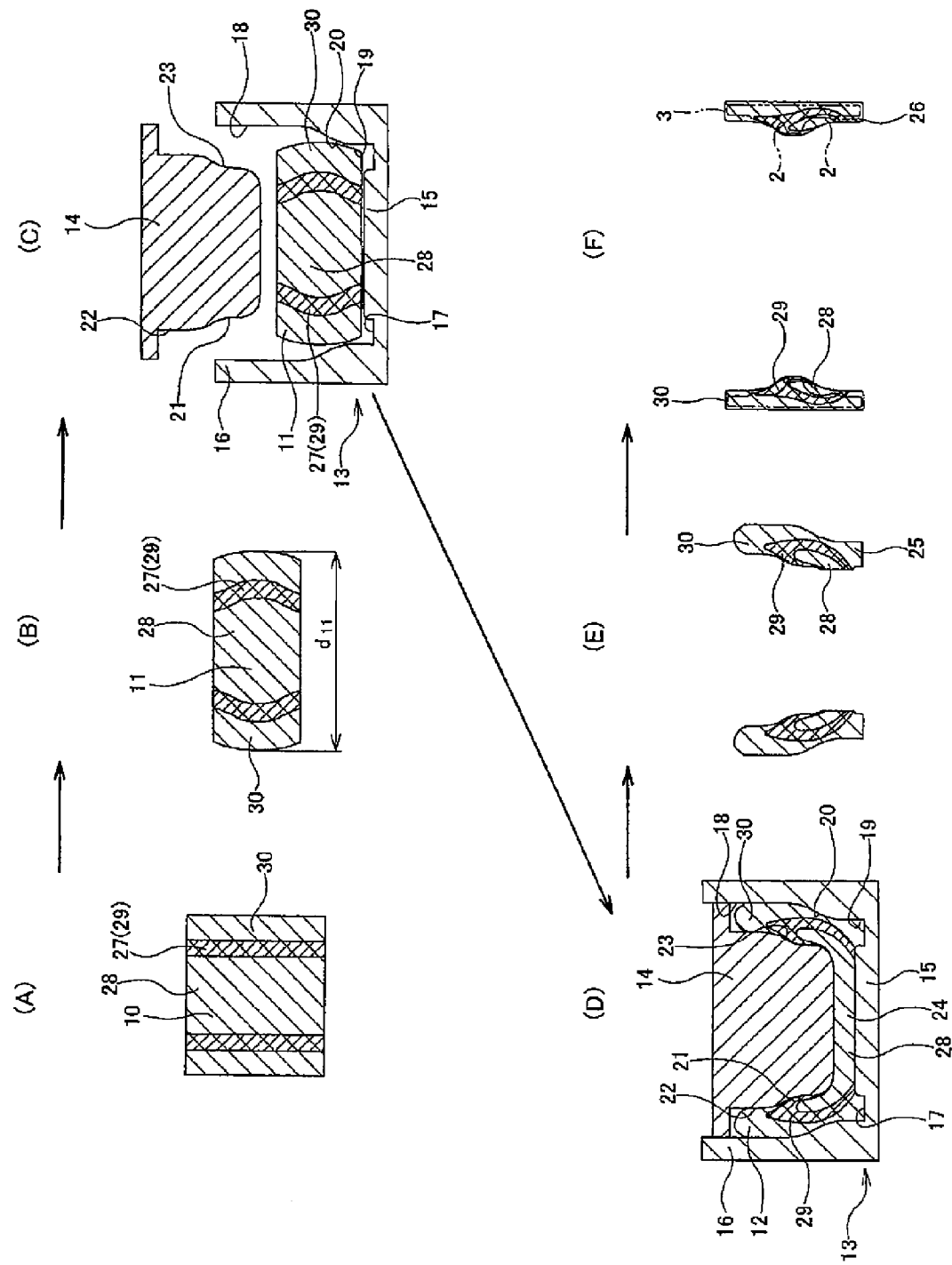
FIG. 8 is views similar to FIG. 1, showing a conventionally known manufacturing method for a bearing outer ring.
Figure 9:
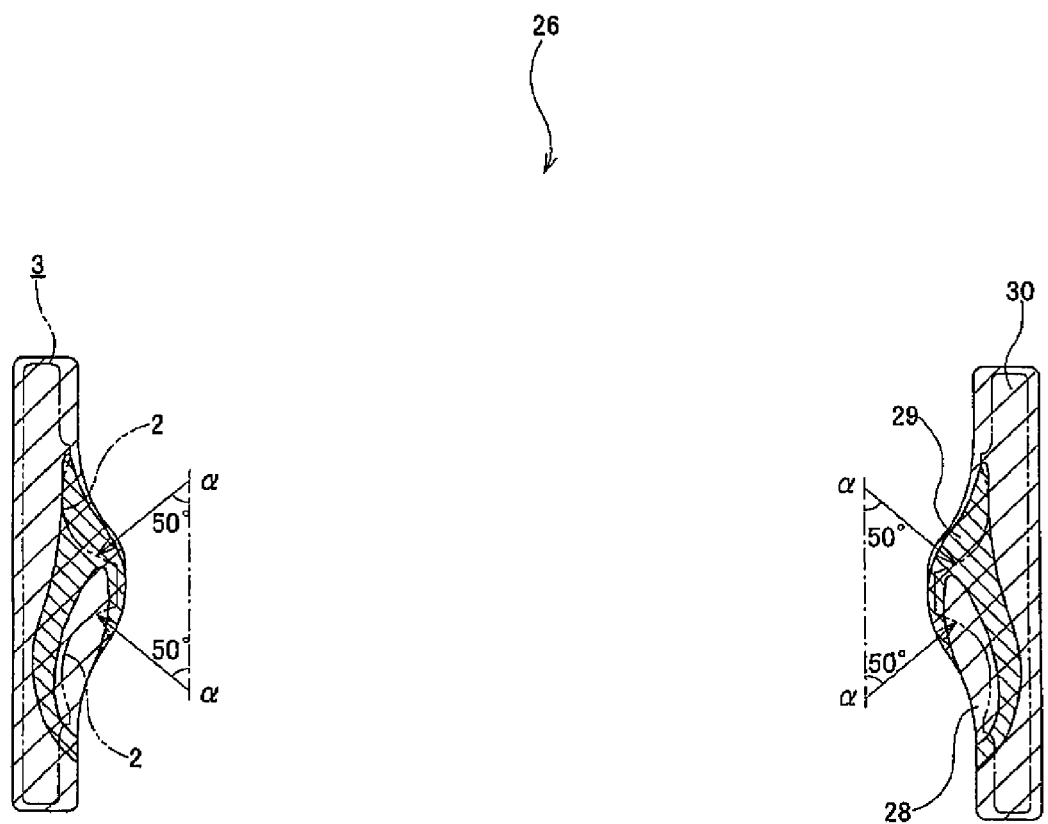
FIG. 9 is a cross-sectional view similar to FIG. 2 of the fourth intermediate material obtained by the conventionally known manufacturing method.

First, in the upsetting process, as shown by from (A) to (B) in FIG. 1, the raw material 10 is compressed in the axial direction to widen its outside diameter, thereby transforming the raw material 10 into the first intermediate material 11a with an expanded axial center portion. The basic implementation of this upsetting process is similar to the aforementioned upsetting process in the conventional manufacturing process as shown in FIG. 8. However, in the present example, in the upsetting process, the closest approach distance between the pressing surfaces of the pair of dies which compress the raw material 10 in the axial direction is closer than in the case of the conventional manufacturing method. That is to say, the amount of processing (compressing amount) of the raw material 10 in the upsetting process is greater than for the case of the conventional manufacturing method. Therefore, the shape of the first intermediate material 11a is closer to a thick disk than a barrel shape. Moreover, the outside diameter $D_{11}$ of the first intermediate material 11a produced by this upsetting process is larger than the outside diameter $d_{11}$ (see (B) in FIG. 8) of the first intermediate material 11 produced in the course of the conventional manufacturing method ($D_{11} > d_{11}$). Specifically, the outside diameter $D_{11}$ is equal to or less than the inside diameter $R_{18}$ of the inner periphery large diameter portion 18 formed on the inner peripheral surface of the die 13 (see (C) and (D) in FIG. 1) used in the subsequent backward extrusion process, and larger than the inside diameter $R_{19}$ of the inner periphery small diameter portion 19 ($R_{18} \geqq D_{11} > R_{19}$).

In the subsequent backward extrusion process, this first intermediate material 11a is subjected to plastic deformation as illustrated by from (C) to (D) in FIG. 1 to obtain the second intermediate material 12a. In this backward extrusion process, the same die 13 and punch 14 as for the case of the conventional manufacturing method described above are used to compress the radial center portions of the first intermediate material 11a in the axial direction, and move the metal material outward in the radial direction as well as moving to both axial direction sides (both forward and backward, but primarily backward). However in the case of the manufacturing method of the present embodiment, the process conditions differ from the case of the conventional manufacturing method only in that the outside diameter $D_{11}$ of the first intermediate material 11a is greater, as described below.

That is to say, in this example, in the backward extrusion process, first, as shown by (C) in FIG. 1, the whole circumference of the radially outlying portion of the first intermediate material 11a sits on the inner periphery inclined portion 20 provided at the axial center portion of the inner peripheral surface of the die 13. Then, from this state, the punch 14 is lowered, and the forward end face of the punch pushes the first intermediate material 11a towards the top surface of the base plate 15 of the die 13. In the initial stage of this pushing process, that is, up to the state where the center portion of the lower face of the first intermediate material 11a contacts the upper surface of the base plate 15, the radially outlying portions of the first intermediate material 11a undergo plastic deformation in a direction towards the opening of the die 13 (upward).

Then after the center of the bottom face of the first intermediate material 11a contacts the top surface of the base plate 15, the punch 14 is lowered further, and the central portion of the first intermediate material 11a is compressed in the axial direction, and the metal material extruded in the radial direction accompanying this compressing action moves primarily in the opposite direction (upward) to the pushing direction of the punch 14, together with the metal material present in the radially outlying portion of the first intermediate material 11a. In this manner, the inner and outer peripheral surfaces of the metal material that moves in the opposite direction to the pushing direction of the punch 14 both form a stepped shape which matches the outer peripheral surface of the punch 14 and the inner peripheral surface of the peripheral wall portion 16 which constitutes the die 13. As a result, by the backward extrusion process, the first intermediate material 11a shown by (C) in FIG. 1, is transformed into the second intermediate material 12a having an overall bottomed cylinder shape in which the inner and outer peripheral surfaces are stepped cylindrical surfaces. Furthermore, some of the metal material moves forward in the pushing direction, entering the annular groove 17 formed in the radially outlying portion of the base plate 15.

This second intermediate material 12a is then removed from the die 13 by the application of upward pressure to the base portion 24 by a counter punch (not shown in the drawing) or other means, and transformed into the fourth intermediate material 26a shown by (F) in FIG. 1 and in FIG. 2 by performing punching and rolling processes in the same manner as in the case of the conventional manufacturing method described above. In the punching process, with the second intermediate material 12a held in the inner peripheral surface of a receiving die (not shown in the drawing), a blanking punch (not shown in the drawing) is pushed against the inside diameter side of the second intermediate material 12a, thereby punching out the base portion 24. By this punching process, the third intermediate material 25a having a stepped cylindrical shape as shown by (E) in FIG. 1 is obtained. Next, in the rolling process, the inner and outer peripheral surfaces of this third intermediate material 25a are subjected to plastic deformation by a pair of rollers (not shown in the drawing) to give a shape matching the peripheral surfaces of the two rollers, thereby obtaining the fourth intermediate material 26a.

This fourth intermediate material 26a still has thicker walls than the finished outer ring 3 (see the chain line in FIGS. 1 (F) and FIG. 2). Thus, the fourth intermediate material 26a is subjected to predetermined machining (turning) and grinding processes to obtain the completed outer ring 3. FIGS. 1 (A) to (F) illustrate changes in the distribution state of the core, middle, and outer metal materials 28 to 30 accompanying of the progress of processes, and FIGS. 1 (F) and FIG. 2 show the distribution state of the metal materials 28 to 30 at the fourth intermediate material 26a stage and a cross-sectional view of the finished outer ring 3.

As is clear from these figures, according to the manufacturing method of the outer ring 3 of the present embodiment, the middle metal material 29 of the middle cylindrical portion 27 shown by the crosshatching in the figure, which has the highest cleanliness of the metal material in the raw material 10 is exposed to at least the portion on which the rolling element load acts, of the two outer ring raceways 2 formed at two locations separated in the axial direction on the inner peripheral surface of the outer ring 3. Consequently, the rolling fatigue life of the two outer ring raceways 2 can be ensured, and the degree of freedom in the design for ensuring the durability of a wheel-supporting rolling bearing unit which includes an outer ring 3 comprising these two outer ring raceways 2 can be improved.

Second Example of the Embodiment

Figure 3:
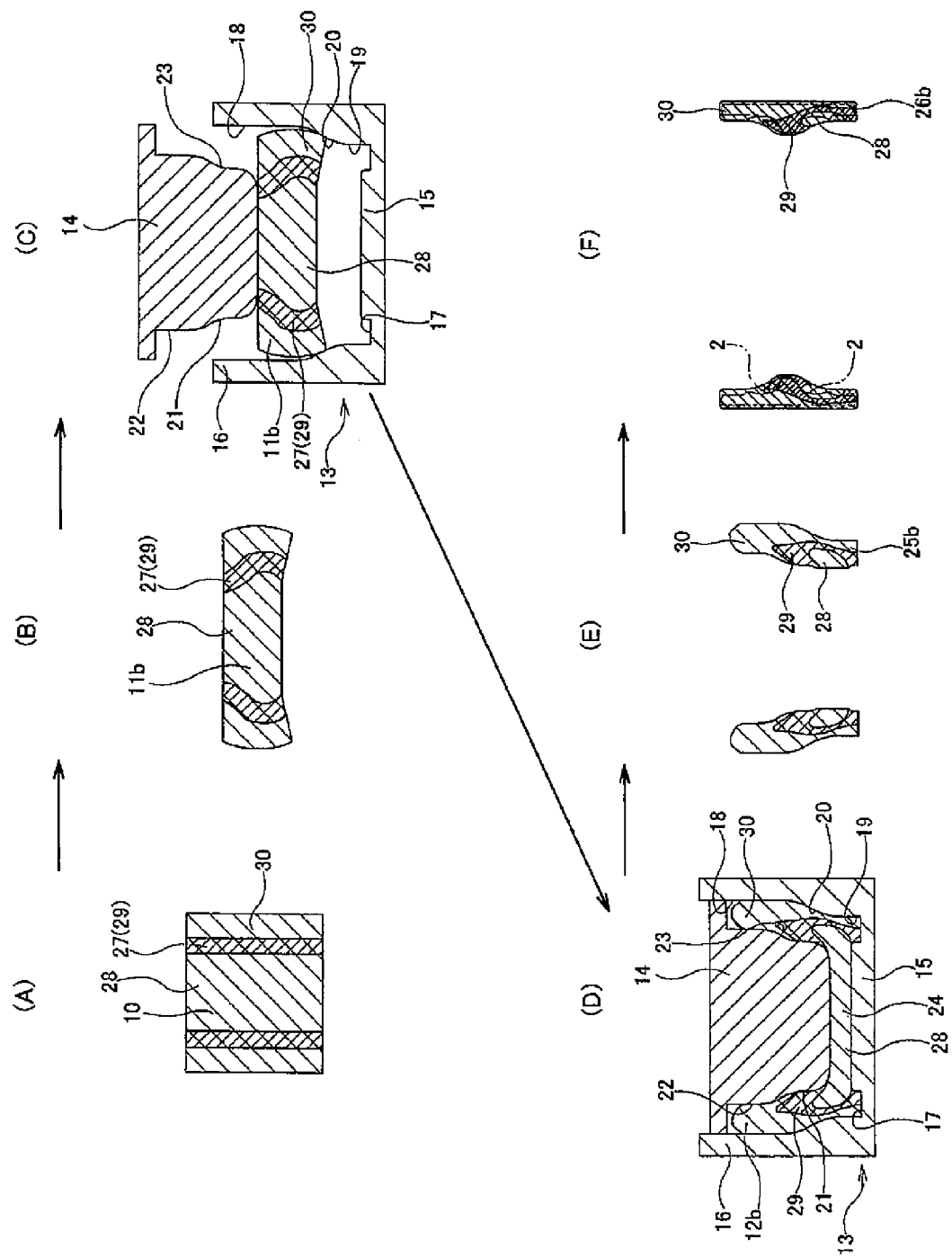
FIG. 3 is views similar to FIG. 1, showing a second example of an embodiment of the present invention.
Figure 4:
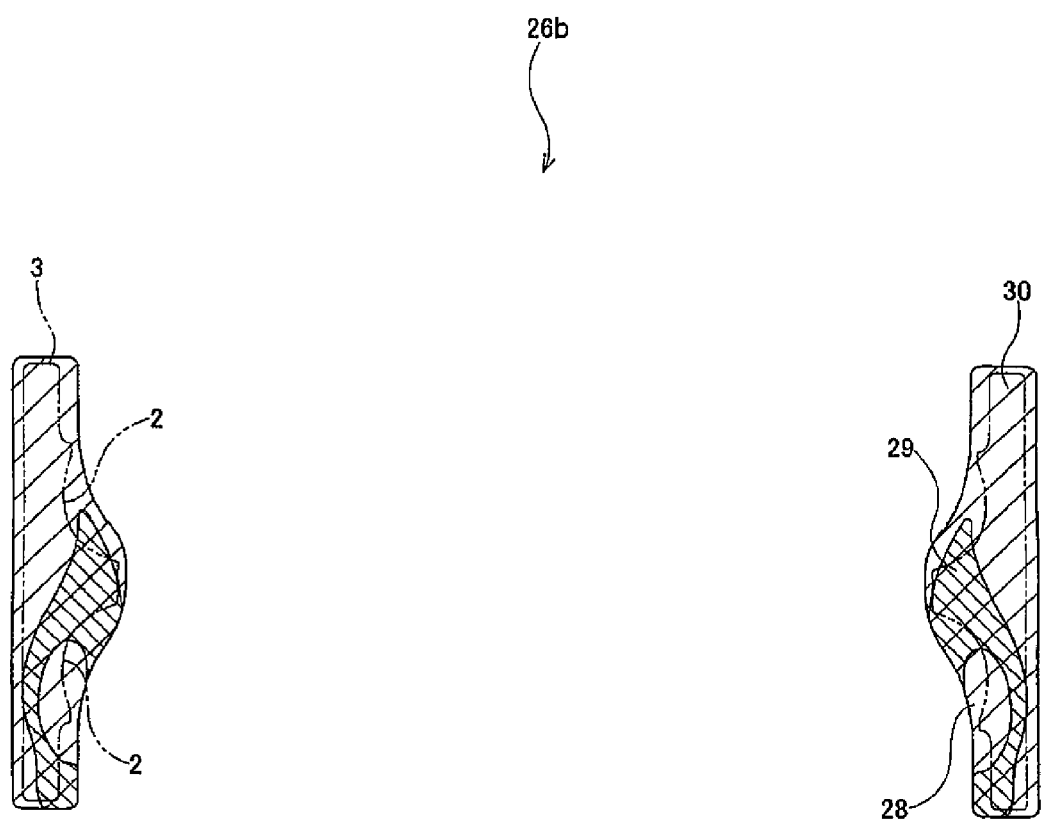
FIG. 4 is a cross-sectional view similar to FIG. 2 of the fourth intermediate material of the second example.

FIGS. 3 and FIG. 4 show a second example of the embodiment of the present invention. In this example, of the pair of dies used in the upsetting process performed in the processes shown from (A) to (B) in FIG. 3, the pressing surface of one of the dies is a flat surface, and the radially outlying portion of the pressing surface of the other die forms an inclined surface which inclines in a direction away from the pressing surface of the one die with increasing proximity to the outer peripheral edge. Furthermore, the shape of the first intermediate material 11b produced by the upsetting process is a shape in which one axial direction surface is recessed further at the radial center than the outer peripheral edge. In the present example, by making the central portion of the one axial direction surface a flat surface, and making the outer peripheral portion a partial conical recessed surface, the one axial direction surface becomes a concave surface in the shape of an inverted truncated cone. In contrast, the other axial direction surface is a flat surface. In the case of the first intermediate material 11b having such a shape, as is apparent from a comparison between (B) and (C) in FIGS. 3 and (B) and (C) in FIG. 1, the extent of displacement of the core metal material 28 and the middle metal material 29 outward in the radial direction accompanying the upsetting process is more marked on the one axial direction side.

In the case of the backward extrusion process shown by from (C) to (D) in FIG. 3, this first intermediate material 11b which is asymmetrical in the axial direction is positioned with the concave one axial direction surface facing the top face of the base plate 15 of the die 13. In the same manner as for the case of the aforementioned first example of the embodiment, the backward extrusion process shown by from (C) to (D) is performed to obtain a second intermediate material 12b, the punching process shown by from (D) to (E) is performed to obtain a third intermediate material 25b, and then the rolling process shown by from (E) to (F) is performed to obtain a fourth intermediate material 26b. As a result, as is clear from a comparison between FIGS. 3 (F) and FIG. 4, and FIGS. 1 (F) and FIG. 2, when compared to the first example of the embodiment, the clean middle metal material 29 is effectively exposed over a greater range of the surface portion of the pair of outer ring raceways 2.

The configuration and effects of other parts are the same as for the case of the first example of the embodiment, and hence equivalent parts are given the same reference symbols, and overlapping descriptions are omitted.

Third Example of the Embodiment

Figure 5:
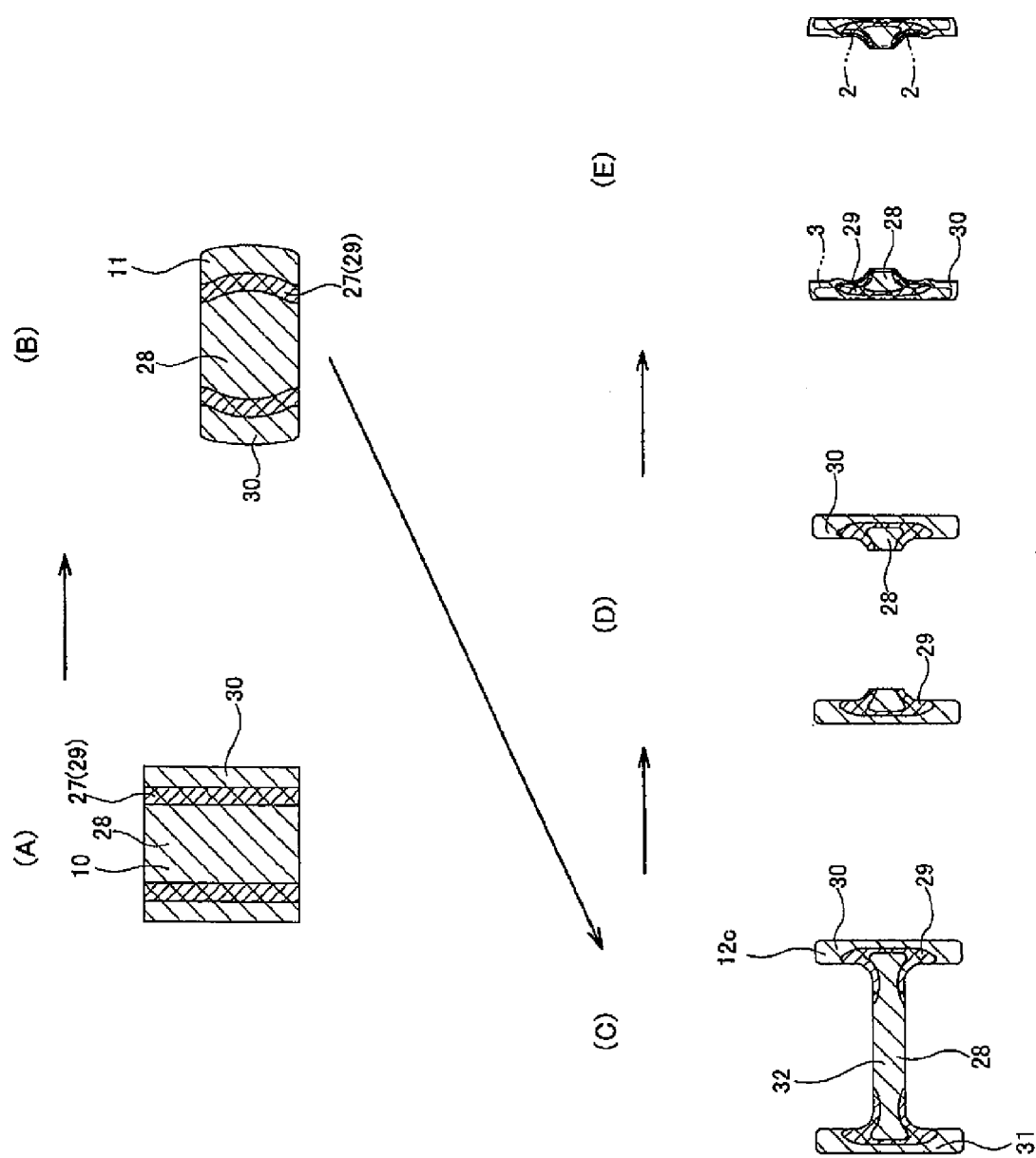
FIG. 5 is views similar to FIG. 1 showing a third example of an embodiment of the present invention, with the die and punch omitted.
Figure 6:
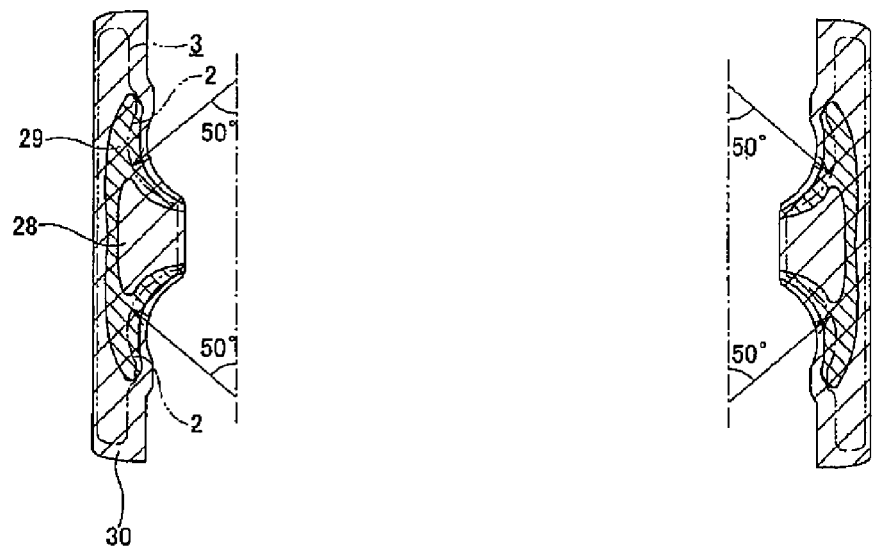
FIG. 6 is a cross-sectional view similar to FIG. 2 of the fourth intermediate material of the third example.

FIGS. 5 and FIG. 6 show a third example of the embodiment of the present invention. In this example, instead of the backward extrusion process performed in from (C) to (D) of FIG. 1 for the case of the first example of the embodiment and described in FIGS. 1 and FIG. 2, a simultaneous forward-backward extrusion process shown by from (B) to (C) of FIG. 5 is performed. In the case of this example, apart from the point that the simultaneous forward-backward extrusion process is adopted, and the first intermediate material 11 is given the same barrel shape as for the aforementioned conventional example, the manufacturing method is the same as that of the first example of the embodiment.

In the case of this example, in the simultaneous forward-backward extrusion process, the first intermediate material 11 shown in FIG. 5 (B) is processed to obtain a second intermediate material 12c shown in FIG. 5 (C). In this manner, in the simultaneous forward-backward extrusion process used to process the first intermediate material 11 to give the second intermediate material 12c, a die having an inner surface shape and punch having an outer surface shape which match the surface shape of the second intermediate material 12c are used. The inner surface shape of the die, as is apparent from the shape of the second intermediate material 12c shown in FIG. 5 (C), is that of a bottomed cylinder in which a circular protrusion having a height less than half the depth of this die corresponding to the height of the second intermediate material 12c is provided at the center of the base. Moreover, the space between the outer peripheral surface of this circular protrusion and the inner peripheral surface of the die serves as a cylindrical shape forming space for forming the lower portion of the second intermediate material 12c. Furthermore, because the inner surface shape of the upper portion of the second intermediate material 12c is processed by pushing the punch into the upper portion, the punch has an outside diameter smaller than the inside diameter of the die.

To process the first intermediate material 11 into the second intermediate material 12c using the aforementioned simultaneous forward-backward extrusion process, the first intermediate material 11 is set in the die in a state with the central portion of the one axial direction surface (bottom surface) of the first intermediate material 11 in contact with (set upon) the circular protrusion. Next, the central portion of the other axial direction surface of the first intermediate material 11 is strongly pressed by the punch, compressing the central portion of the first intermediate material in the axial direction between the forward end face (bottom face) of the punch and the forward end face (top face) of the circular protrusion. Then, the metal material extruded outward in the radial direction accompanying this compressing action, together with the metal material present at the radially outlying portions of the first intermediate material 11, moves into the cylindrical shape forming space and also moves in the direction opposite to the pressing direction of the punch into the cylindrical space present between the outer peripheral surface of the punch and the inner peripheral surface of the die. Thus, the second intermediate material 12c shown in FIG. 5 (C) is obtained, in which a cross wall 32 is provided in the axial center portion of the cylinder 31 on the inside diameter side. Then, in the same manner as for the case of the first example of the embodiment, this second intermediate material 12c is subjected to the punching process shown by from (C) to (D) of FIG. 5, the rolling process shown by from (D) to (E) of FIG. 5, and further finishing processes, to attain the shape shown by the chain line in FIGS. 5 (E) and FIG. 6, and process into the outer ring 3 for a double-row ball bearing.

In the case of this example, because the process that produces the second intermediate material 12c from the first intermediate material 11 is performed by a simultaneous forward-backward extrusion process in a substantially symmetrical manner with respect to the axial direction of the two materials 11 and 12c, then as is clear from FIGS. 5 (C) to (E) and FIG. 6, the middle metal material 29 which has high cleanliness is exposed across the entire portion which forms the double-row outer ring raceways 2. Consequently, the rolling fatigue life of the two outer ring raceways 2 can be sufficiently ensured. Moreover, the degree of freedom in the design for ensuring the durability of a wheel-supporting rolling bearing unit which includes an outer ring 3 comprising these two outer ring raceways 2 can be further improved.

INDUSTRIAL APPLICABILITY

In the above examples of the embodiment, the description has been for the case where an outer ring 3 constituting a double-row angular ball bearing 1 is made by the manufacturing method of the present invention. In contrast, the manufacturing method for a bearing outer ring of the present invention may also be applied to the case of making an outer ring constituting a double-row angular tapered roller bearing. In this case, considering the width of the double-row outer ring raceways formed on the inner peripheral surface of the outer ring, and the machining allowance in the finishing processes, the position in the axial direction of the inner periphery inclined portion provided on the inner peripheral surface of the central portion of the die used in the backward extrusion process is devised so that the middle metal material in the raw material is exposed at the surface of the outer ring raceways.

The invention claimed is:
1. A manufacturing method in which a cylindrical material of a metal material is sequentially subjected to an upsetting process, a simultaneous forward-backward extrusion process, a punching process, a rolling process, and a finishing process, to thereby produce a bearing outer ring comprising back-to-back arrangement double-row outer ring raceways at two locations in an axial direction of the bearing outer ring on an inner peripheral surface thereof, characterized in that, in the upsetting process, the cylindrical material is compressed in an axial direction thereof between mutually opposing pressing surfaces of a pair of dies, to obtain a first intermediate material having an axial direction, in the simultaneous forward-backward extrusion process, a center portion of the first intermediate material is compressed in the axial direction between a die and a punch, the die having a shape of a bottomed cylinder that defines an inner peripheral surface and a base of the die and has an inner diameter and a depth defined thereby, the die further comprising a circular protrusion protruding from the base to have an outer peripheral surface and a height less than half the depth of the die to define a cylindrical shape forming space between the outer peripheral surface of the circular protrusion and the inner peripheral surface of the die, the punch having an outer peripheral surface that defines an outside diameter that is smaller than the inside diameter of the die, and a portion of the metal material extruded outward in a radial direction accompanying this compressing action, together with another portion of the metal material present in a radially outlying portion of the first intermediate material, moves into the cylindrical shape forming space and also moves in a direction opposite to the axial direction into a cylindrical space present between the outer peripheral surface of the punch and the inner peripheral surface of the die, to give a second intermediate material having a cylindrical shape provided with a cross wall on an inside diameter side of an axial center portion of the cylindrical shape, in the punching process, the cross wall of the second intermediate material is punched out to thereby produce a third intermediate material having an overall form of a cylinder having inner and outer peripheral surfaces, in the rolling process, the inner and outer peripheral surfaces of the third intermediate material are subjected to plastic deformation to produce a fourth intermediate material having axial ends, an axial center portion, a cylindrical outer peripheral surface having an outside diameter that does not vary substantially in relation to an axial direction of the fourth intermediate material, and an inner peripheral surface that defines an inside diameter of the fourth intermediate material, in which the inside diameter at the axial center portion of the fourth intermediate material is smallest, and in which side portions of the axial center portion are inclined so that the inside diameter increases gradually towards both of the axial ends, and in the finishing process, the inner peripheral surface of the fourth intermediate material is shaved off to form the two outer ring raceways in the inner peripheral surface.

* * * * *